US011601342B1

(12) United States Patent
Chao et al.

(10) Patent No.: US 11,601,342 B1
(45) Date of Patent: Mar. 7, 2023

(54) METHOD AND SYSTEM TO AUTOMATE DEVICE MANAGEMENT USER INTERFACE HOSTING OF DEVICES, ASSETS, AND APPLIANCES

(71) Applicant: Dell Products L.P., Round Rock, TX (US)

(72) Inventors: Ching-Yun Chao, Austin, TX (US); John Korchemniy, Spokane, WA (US); Rajesh Basa, Bothell, WA (US); Rajini Ramachandran Karthik, Austin, TX (US); Rajeev Rangappa, Redmond, WA (US); Anil Varkhedi, San Jose, CA (US); Suresh Attuluri, Sammamish, WA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/584,078

(22) Filed: Jan. 25, 2022

(51) Int. Cl.
*H04L 67/10* (2022.01)
*H04L 41/22* (2022.01)

(52) U.S. Cl.
CPC ............ *H04L 41/22* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 2008/0072291 A1* | 3/2008 | Carley | H04L 63/20 726/3 |
| 2016/0098254 A1* | 4/2016 | Paternostro | G06F 8/10 717/105 |
| 2017/0364381 A1* | 12/2017 | Suber | G06F 9/4401 |
| 2018/0198839 A1* | 7/2018 | Demulder | H04L 67/51 |
| 2018/0287885 A1* | 10/2018 | Shakimov | H04L 41/0813 |
| 2019/0268212 A1* | 8/2019 | Na | H04L 69/18 |
| 2020/0174861 A1* | 6/2020 | Christy Jesuraj | G06F 9/547 |
| 2020/0293541 A1* | 9/2020 | Pigeon | G06F 9/54 |

OTHER PUBLICATIONS

J. Elek, D. Jocha and R. Szabo, "Network Function Chaining in DCs: The Unified Recurring Control Approach," 2015 Fourth European Workshop on Software Defined Networks, 2015, pp. 13-18, doi: 10.1109/EWSDN.2015.54. (Year: 2015).*

* cited by examiner

*Primary Examiner* — Uzma Alam
(74) *Attorney, Agent, or Firm* — Terrile, Cannatti & Chambers, LLP; Emmanuel A. Rivera

(57) ABSTRACT

Described herein are methods and a system for managing devices in remote data centers using a cloud service user interface (UI). The cloud service UI receives device management requests to device management application program interface (API). At the cloud service side, the device management requests to device management application program interface (API) are intercepted and converted to device cloud management REST interfaces. The device cloud management REST interfaces to a remote data center of devices, and converted to device native API used to manage a specific device.

20 Claims, 8 Drawing Sheets

US 11,601,342 B1

METHOD AND SYSTEM TO AUTOMATE DEVICE MANAGEMENT USER INTERFACE HOSTING OF DEVICES, ASSETS, AND APPLIANCES

BACKGROUND OF THE INVENTION

Field of the Invention

The present invention relates to displays implemented by information handling systems. More specifically, embodiments of the invention provide for device management user interface hosting for arbitrary devices, assets, and appliances.

Description of the Related Art

As the value and use of information continues to increase, individuals and businesses seek additional ways to process and store information. One option available to users is information handling systems. Information handling systems include personal computers (PC), server computers, such as desktops. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling devices include, access and use various devices, assets and appliances, which collectively referred can be referred to as devices. Such as devices are used by information handling devices for computing (e.g., server computers), network, storage, etc. The devices can be located at remote data centers, which can be public or private. The devices can provide a user interface (UI), such as web based UI, to allow information handling systems (users) to access and manage the device. A UI is part of the or hosted at a device and unique to the device.

An information handling system that uses multiple devices, may have to access multiple device UIs. UIs are not standardized and can vary from vendors and products (devices). Users of information handling systems may get accustomed to the use of particular UIs and device functions provided by device UIs. There may be significant investment in the development and maintenance of device UIs.

SUMMARY OF THE INVENTION

A computer-implementable method, system and computer-readable storage medium for managing devices in remote data centers using a cloud service user interface (UI) comprising providing the cloud service UI at an information handling system; receiving a device management request to device management application program interface (API) at the cloud service UI; intercepting the device management request to device management API; converting the device management request to device management API to a device cloud management REST interface; propagating the device cloud management REST interface to a remote data center of devices; and converting the device cloud management REST interface to device native API used to manage a specified device.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
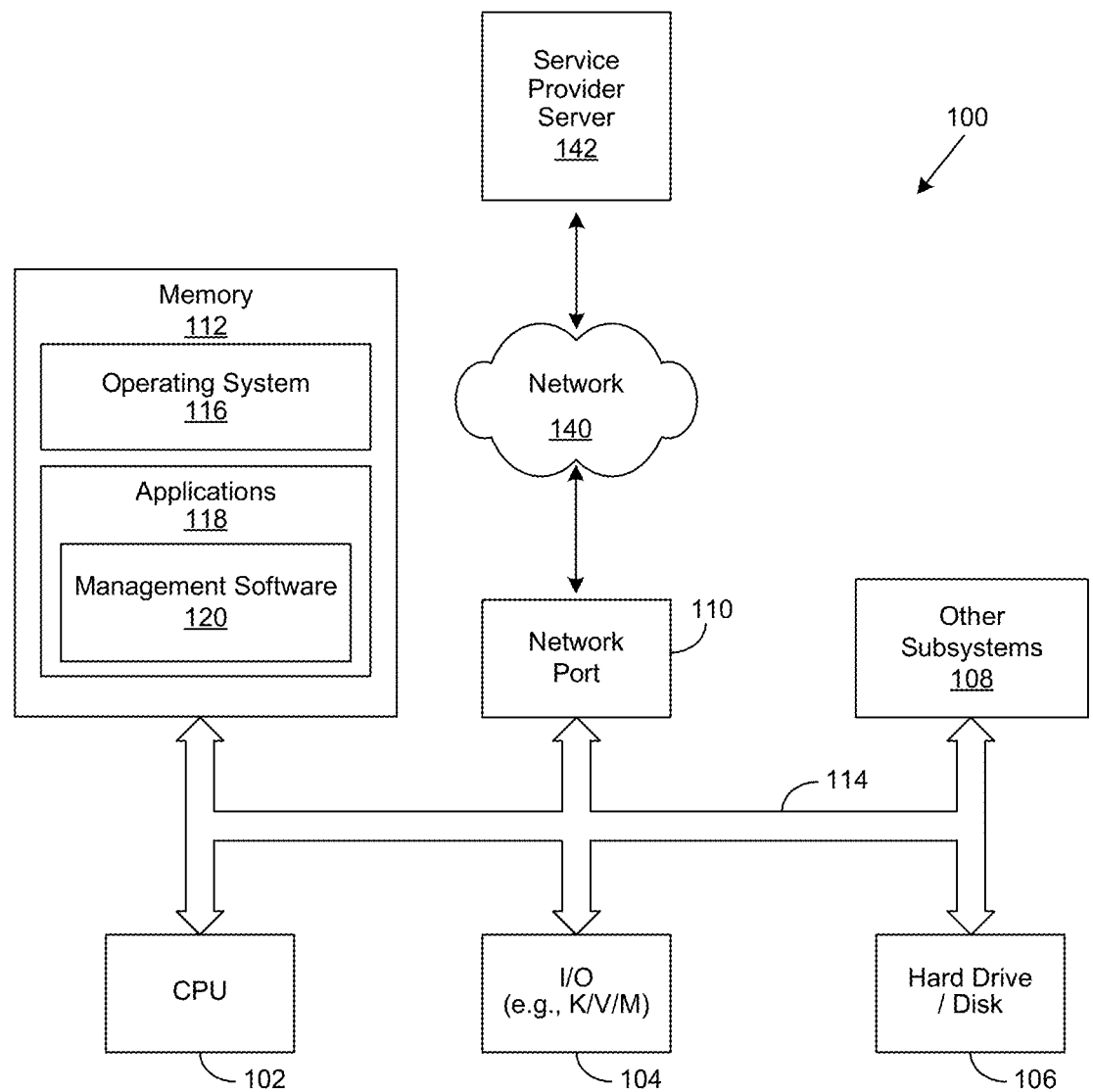
FIG. 1 is a general illustration of components of an information handling system as implemented in the present invention.

Implementations described herein provide a management utility on a cloud service to allow information handling systems (users) to manage their devices form one user interface (UI) from any location by accessing through the web/Internet.

implementations provide for an automated process that maps device management application program interfaces one-to-one to cloud service management REST interfaces. Devices in remote data centers are managed by information handling systems from the cloud service using the mapped REST interfaces.

Implementations provide for an automated process to intercept device management web applications API invocation and convert such to a corresponding cloud service management REST API invocation. Although a device web application is designed to run on a device, implementations provide for hosting of device web applications on the cloud service. When a device web UI application accesses a device management API, the conversion provides access to a cloud management REST API and propagates access all the way to the specified remote device. Running device web UI application on the cloud service can be provided without investment in modifying the code for the device web UI application.

By providing information handling systems (users) to use device management web UI application on the cloud service to manage devices in remote data centers, familiar legacy device UIs are provided to information handling systems (users). Accessing devices through the cloud service overcomes the need to physically connect to and login to each individual device.

Implementations further provide mapping information handling systems (users) cloud service identities and cloud access permission to device user identities and device access permission. Information handling systems (users) can securely access devices from the cloud services. Furthermore, information handling systems and users, and their access to devices are isolated from other information handling systems and users.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, gaming, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

FIG. 1 is a generalized illustration of an information handling system 100 that can be used to implement the system and method of the present invention. The information handling system 100 can be a host to the peripheral devices described herein.

The information handling system 100 includes a processor (e.g., central processor unit or "CPU") 102, input/output (I/O) devices 104, such as a microphone, a keyboard, a video display or display device, a mouse, and associated controllers (e.g., K/V/M), a hard drive or disk storage 106, and various other subsystems 108.

In various embodiments, the information handling system 100 also includes network port 110 operable to connect to a network 140, where network 140 can include one or more wired and wireless networks, including the Internet. Network 140 is likewise accessible by a service provider server 142.

The information handling system 100 likewise includes system memory 112, which is interconnected to the foregoing via one or more buses 114. System memory 112 can be implemented as hardware, firmware, software, or a combination of such. System memory 112 further includes an operating system (OS) 116 and applications 118. Implementations provide for applications 118 to include management software 120 that allows the information handling system 100 to access devices, such as devices residing at remote data centers. Access can be though web based user interfaces.

Figure 2:
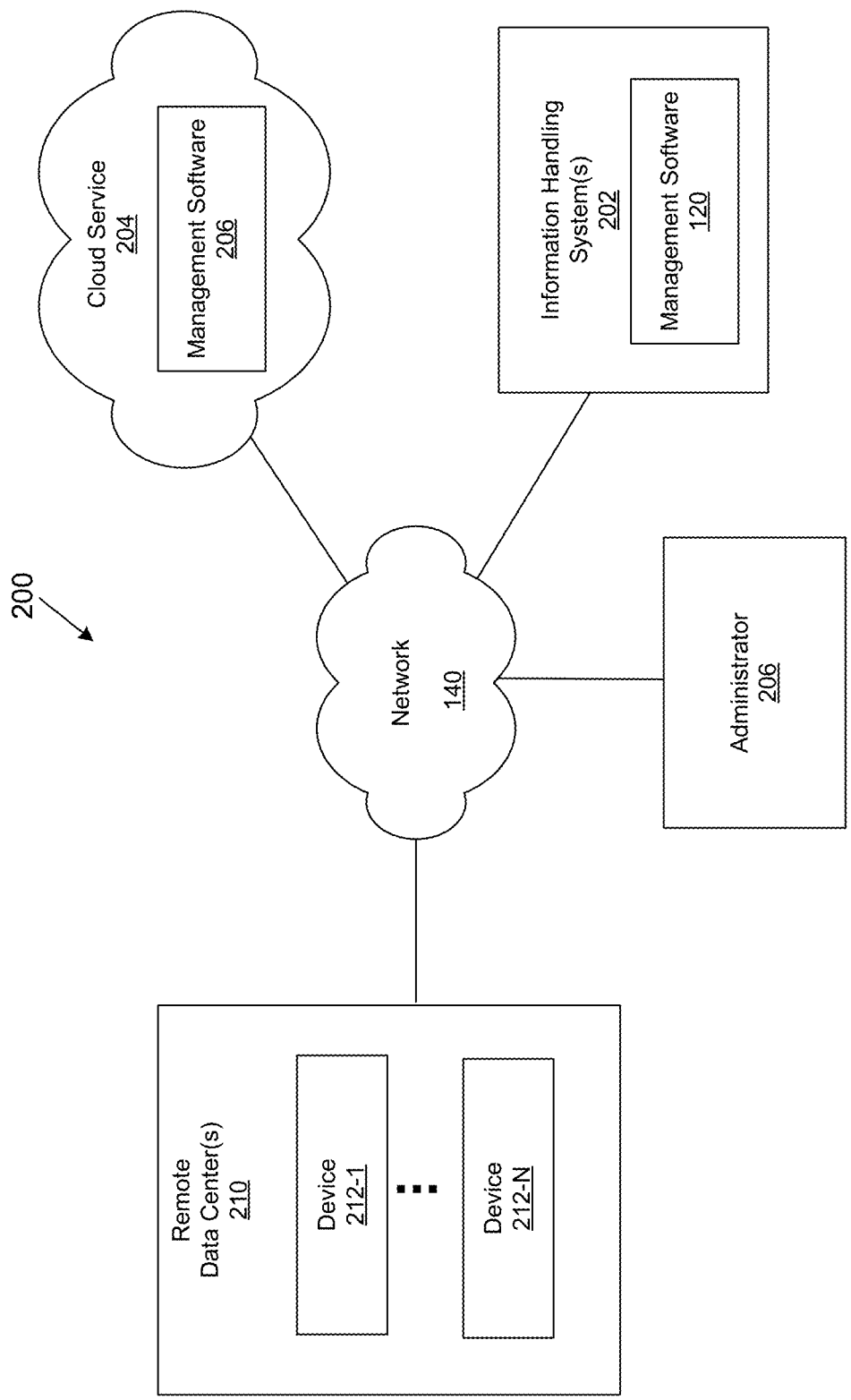
FIG. 2 illustrates a system as implemented in the present invention.

FIG. 2 shows a system 200 that supports the processes described herein. One or more information handling systems 202 are connected to the network 140 describe in FIG. 1, where network 140 can include one or more wired and wireless networks, including the Internet. A cloud service 204 is accessible through network 140. In various embodiments, cloud service 204 is part of the comprehensive network 140.

Cloud service 204 can be considered as a system that includes a plurality of processing systems communicably coupled through a network, such as network 140, wherein the processing systems include non-transitory, computer-readable storage medium embodying computer program code interacting with a plurality of computer operations configured to perform processes, such as described herein.

Although cloud service 204 is described as a "cloud" or "cloud computing", it is to be understood that other implementations, such as multiple server computers and the like, can be implemented. Embodiments provide for the cloud service to include management software 206 that implements processes described herein.

Implementations provide for an administrative entity, such as an administrator 208 to connect to network 140. Administrator 206 can access and communicate with the various elements of system 200, including information handling system(s) 202 and cloud service 204.

The system 200 further includes one or more remote data center(s) 210. Remote data center(s) 210 are connected to the network 210, and accessible by information handling system(s) 202 and cloud service 204. Remote data center(s) 210 include one or more devices 212-1 to 212-N. The devices 212 include various devices, assets and appliances for computing, network switches/connectivity, storage appliances, etc. that are accesses and used by information handling system(s) 202. As described herein, access to the devices 212 is through a user interface (UI) at the cloud service 204/management software 206. Devices 212 can be provided and supported by various product providers or vendors.

Figure 3:
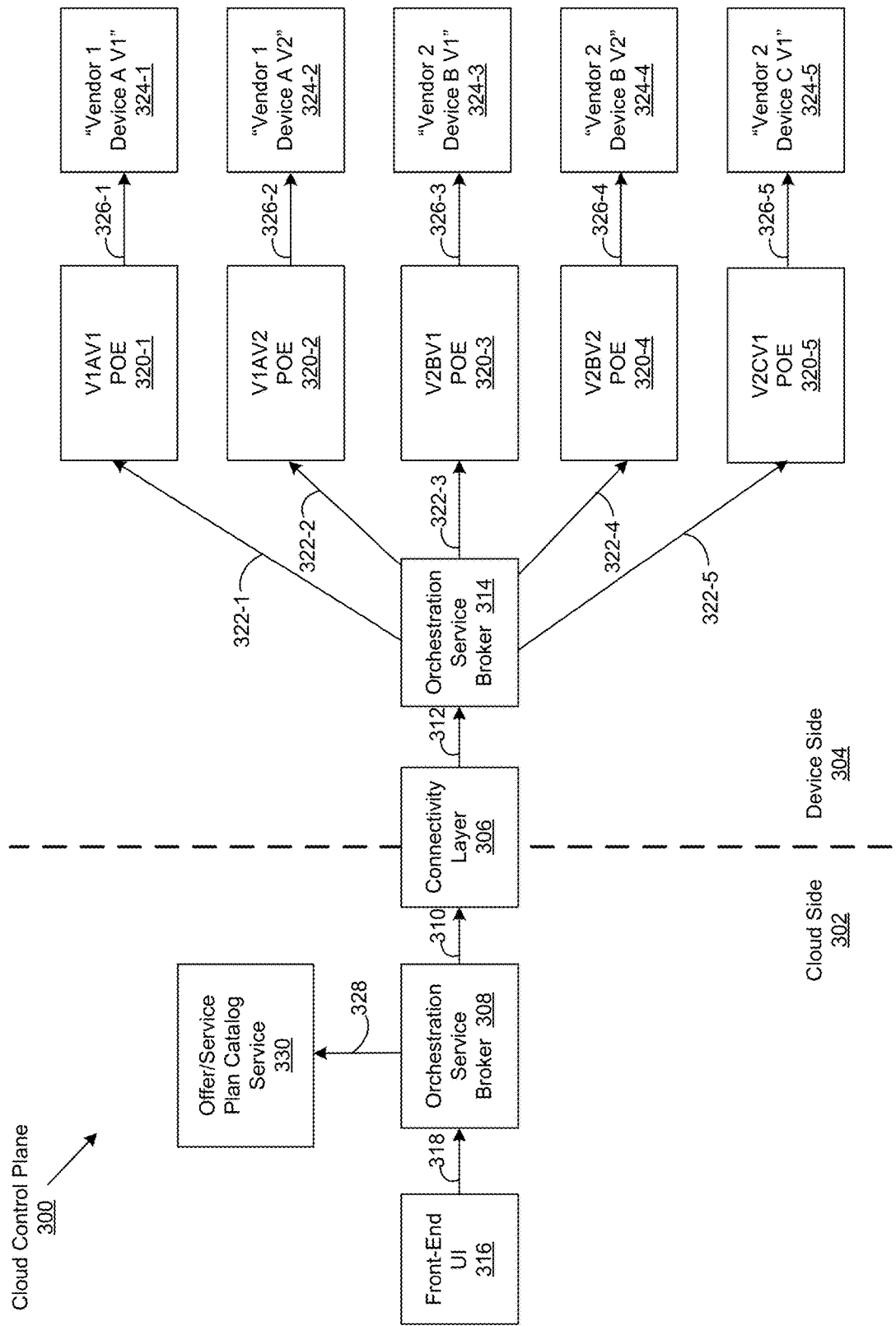
FIG. 3 illustrates a cloud control plane architecture as implemented in the present invention.

FIG. 3 shows an implementation of cloud control plane architecture 300. Shown is a cloud side 302 representing cloud service 204 and device side 304. In various implementations, the device side 304 represents devices 212 that are deployed in remote data center(s) 210.

A connectivity layer 306 "connects" cloud side 302 to device side 304. The connectivity layer 306 can be considered as an abstract representation of a communication implementation on top of one of various communication mechanisms such as VPN, SSH, IP tunnel, MQTT network protocol, etc., to connect the cloud side cloud side 302 with device side 304 (remote data center).

Product orchestrator engines (POE), as further described herein, are specific to particular device 210 part number, version number, specific vendor, etc. Implementations provide for POEs to be configured as docker container images which can contain automation scripts invoking device functions to manage a target device.

A cloud side 302 orchestration service broker 308 requests flow 310 to connectivity layer 306, which is linked 312 to a device side 304 orchestration service broker 314. A front-end user interface (UI) 316 is made available to information handling system(s) 202. The orchestration service broker 308 exposes device management functions via the front-end US 316 when invoked at information handling system(s) 202.

In particular, the front-end UI 316 invokes and provides a request flow 318 for orchestration service broker 308 REST interfaces. The orchestration service broker 308 forwards the requests to device side 304 or remote data center, via connectivity layer 306. The orchestration service broker 314 de-multiplexes the requests flow and invokes REST interfaces of the request flow 318.

A request can specify a product orchestrator engines or POE, such as POEs 320-1, 320-2, 320-3, 320-4 and 320-5. The orchestration service broker 314 invokes a specific POE 320, as represented by 322-1, 322-2, 322-3, 322-4 and 322-5. The specific POE 320 is resident on a device 212. In other words, a POE 320 is specific to a device 212. A POE 320 that is invoked 322 by the orchestration service broker 314, in turn invokes 326 a specific device 324 identified by vendor, device ID, and version, through the use of device native interfaces. The device native interfaces can include command line interfaces (CLI), APIs which can be REST interfaces, or any other interfaces. For example, V1AV1 (vendor 1, device A, version 1) POE 320-1 corresponds to vendor 1 device A version 1 324-1.

In the end-to-end flow of cloud control plane 300, automation scripts in POEs 320 can be specific to a device 324, to a device model of a device family, to automation tools a device uses, to device specific modules that plug-in, and o automation tools (e.g., a VMware vsphere module plugin to the Terraform automation tool).

Automation scripts can be sensitive to versions of a device 324, to version of automation tool, to version of device module plugin, to version of Linux version, and to version of the POE 320 implementation. A fix or patch of scripts in a POE 320 can be performed when underlying dependencies change. When device 324 functions are added or removed, there can be an impact on a corresponding POE 320. Changes to the version of POE 320 can be implemented. A new version of a POE 320 implementation can contain new automation scripts or remove some automation scripts. This implies changes to orchestration service broker 308 REST interfaces of the particular device 324.

The following is an example of managing orchestration service broker 308 REST interfaces to device 324 functions mapping that can be scaled to devices 324 and different versions of devices 324. In this example, devices using PowerStore interfaces are described; however, it is to be understood that other interfaces supporting other devices can be implemented.

The device resource management interfaces and orchestration service broker 308 interfaces mapping are specified in configuration files. A configuration file can be referred to as a service plan. A service plan has a specific version. Using the "create volume" function of a PowerStore storage device as an example, PowerStore has a REST interface for the "create volume" function. The REST request method and uniform resource identifier (URI) is "POST/volume." This device interface is map to orchestration service broker 308 REST interfaces as "POST /osb/v2/service_instances/{instance_id}/{resource_name}/{resource_id}", where {resource_name} is "volume."

Figure 4:
FIG. 4 illustrates configuration data as implemented in the present invention.

FIG. 4 shows an example configuration data 400 as part of a service plan. A base orchestration service broker 308 URI is "/osb/v2/service_instances/{instance_id}/" where the instance_id is a unique identifier assigned by the orchestration service broker 308 to indicate a specific deployment. The resource_id is a unique identified used by the orchestration service broker 308 to indicate a specific device 324 of a deployment. The resource_name: volume under resource_instances section specifies a resource_name in the URI, and yields a mapped orchestration service broker 308 REST URI "/osb/v2/service_instances/{instance_id}/volume/{resource_id}."

The service plan can be embedded in a POE 320. Implementations provide for the service plan to be signed and sealed in the POE 320 when a POE 320 container image is created. The POE 320 is "sealed" in the sense that the content in the POE cannot be modified. In this example the service plan version 402 is 1.0.1. The POE 320 can be used to manage device version and tool versions that are compatible with the service plan version (e.g., version 1.0.1). Multiple versions of service plans may be sealed into a POE 320 when the POE 320 is compatible with all those service plan versions.

The "services id" 404 and "plans id" 406 uniquely define orchestration service broker 308 REST interfaces name space of a device 324. Referring back to FIG. 3, in various implementations, the front-end UI 316 uses an offer configuration plan identifier 328 to look up a service plan from the offer/service plan catalog service 330. The service plan content information allows the front-end UI 316 to construct a device management orchestration service broker 308 REST request massage. An orchestration service broker 308 request message body contains a service_id parameter and a plan_id parameter.

In various implementations, the orchestration service broker 308 listens and accepts device management request messages whose URI fits the pattern "/osb/v2/service_instances/{instance_id}/{resource_name}/." The orchestration service broker 308 then looks up a service plan from the offer/service plan catalog service 330. The service plan content information allows the front-end UI 316 to construct a device using the request body service_id and plan_id as search key. Then the orchestration service broker 308 validate the resource_name "volume" against the service plan "resource_instances" resource_name and the list of supported CRUD method.

Implementations provide that the orchestration service broker 308 does not hard code any device management REST interfaces. The orchestration service broker 308 uses the specified service plan data to derive the device management REST interfaces. Orchestration service broker 308 REST interfaces of different device model and device version may assume the same REST interface URI which is allowed because the unique service_id and plan_id in the REST request message body uniquely defines a name space for the device 324. Multiple, different devices 324 can share the same orchestration service broker 308 REST interfaces without the issue of name collision since different devices REST interfaces are mapped to different namespaces.

Therefore, cloud control plane 300 device resource management REST interfaces can have unlimited extensibility scale to any type and number of devices. Management functions of devices 324 are mapped to cloud control plane 300 resource management REST interfaces in separate namespace to avoid REST URI name collisions. The device function to orchestration service broker 308 REST interfaces mapping is defined in service plan configuration files, such that there is no hard-coded logic which allows the orchestration service broker 308 to dynamically grow and scale without limit.

Previously described herein is mapping device management user interfaces (API, CLI, REST, etc.) to a cloud management REST interfaces on the cloud in an isolated name space. Other implementations further describe extending the user interface mapping method to enable devices 324 that have a web-based user management UI to run on the cloud without code changes.

Implementations provide for mapping device API interfaces or CLI interfaces to the cloud management interfaces and mapping device management user interfaces in the cloud for the device native management Web UI to access.

Processes are automated to minimize development effort and is scalable to support different devices from multiple suppliers or vendors 208.

An approach is automated device management interfaces mapping to cloud management REST interfaces. The example of PowerStore device interfaces is continued; however, it is to be understood that other interfaces supporting other devices can be implemented. PowerStore can create a volume management interface, "POST /volume", which can be mapped by orchestration service broker 308 REST interface as "POST/osb/v2/service_instances/{instance_id}/{resource_name}/", where the "service_id" specifies a specific deployment and "resource_name" specifies a particular device resource within such deployment, which is "volume."

Figure 5:
FIG. 5 illustrates a cloud control plane architecture as implemented in the present invention.

PowerStore provides for a list of management interfaces. FIG. 5 shows a table 500 with a list of example interfaces and how the interfaces map to orchestration service broker 308 REST interfaces in a systematic that is repeatable to all other PowerStore management interfaces. PowerStore device management interfaces can automatically map to corresponding orchestration service broker 308 REST interfaces organized in a PowerStore device specific namespace. Furthermore, a POE 320 docker container image can be created automatically that can execute these commands remotely in a private data center (i.e., device side 304) on the devices 324. A POE 320 can have a built-in web service that listens to a PowerStore device orchestration service broker 308 REST request messages. The PowerStore device orchestration service broker 308 REST interface maps to an automation script that is created automatically. Each script can be represented as a one-line expression as shown in the following example list/curl command:

curl command -X POST https://{powerstore_device_IP}/volume --data-raw '{"name":"bigvolume","size": 1048576}'.

Figure 6:
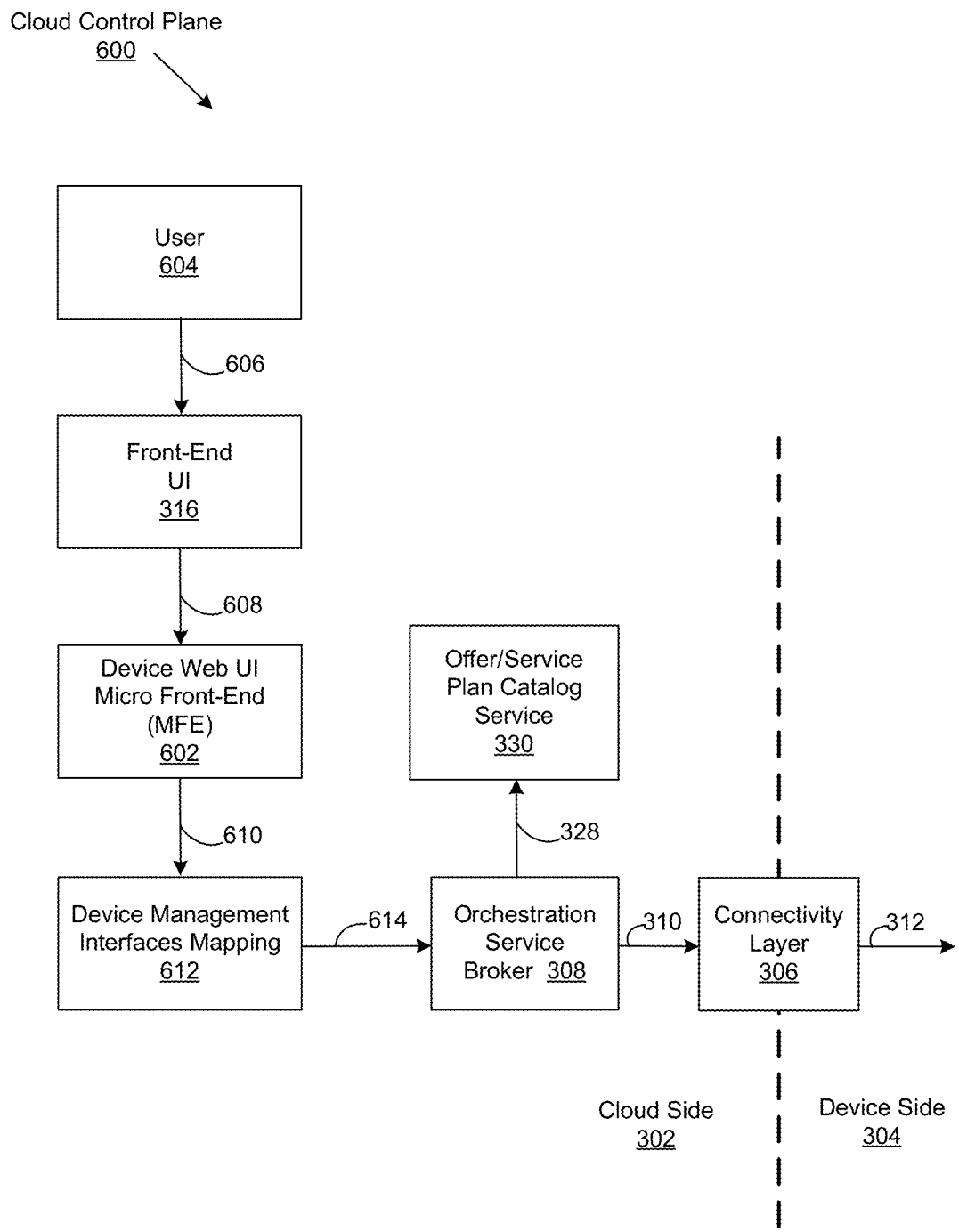
FIG. 6 illustrates a table example interfaces that map to orchestration service broker interfaces.

Another approach is to run device native UI on the cloud (cloud plane) through automated device management interfaces mapping. FIG. 6 shows a cloud control plane architecture 600 that builds on the previously described cloud control plane architecture 300.

A device native web UI application is packaged with a "device management interface mapping" utility in a device web UI micro front-end (MFE) 602. The device web UI MFE 602 can be configured to run in a cloud control UI management portal. A device native web UI can use device management interfaces to perform device management functions.

When user 604 triggers 606 a device web UI management function, the device web UI or front-end UI 316 invokes device management REST interfaces 608 which are intercepted 610 by a device management interfaces mapping 612 utility. The device management interfaces mapping 612 maps the device management REST interface to the corresponding orchestration service broker 308 device management REST interface and then send a request message 614 to the orchestration service broker 308. The request is routed through link 310, connectivity layer 306, and to link 312 of device side 304.

Referring back to FIG. 3, from orchestration service broker 314, invokes 322 a specific POE 320, where POE 320 can be a PowerStore POE. POE 320 is invoked 322 to execute, triggering corresponding automation scripts in the POE 320, which can then execute the example curl command described above, which in turn sends a device request message 326 to a device to execute.

Referring back to FIG. 6, the described provides creating an automated process that packages a device native management web UI application into device web UI MFE 602 to run in the cloud control plane 600 UI application. Familiar device management UIs running on the cloud can be used to remotely manage devices 324 in private data centers in a secure manner.

Previously described herein is mapping device management user interfaces (API, CLI, REST, etc.) to a cloud management REST interfaces on the cloud in an isolated name space. Other implementations further describe extending the user interface mapping method to enable devices 324 that have a web-based user management UI to run on the cloud without code changes.

Implementations provide for mapping management API of a device 324 to the cloud (cloud control plane) and run device native web UI application as micro front-end (MFE) 602 on the cloud (cloud control plane) and leveraging the device API on the cloud (cloud control plane).

Figure 7:
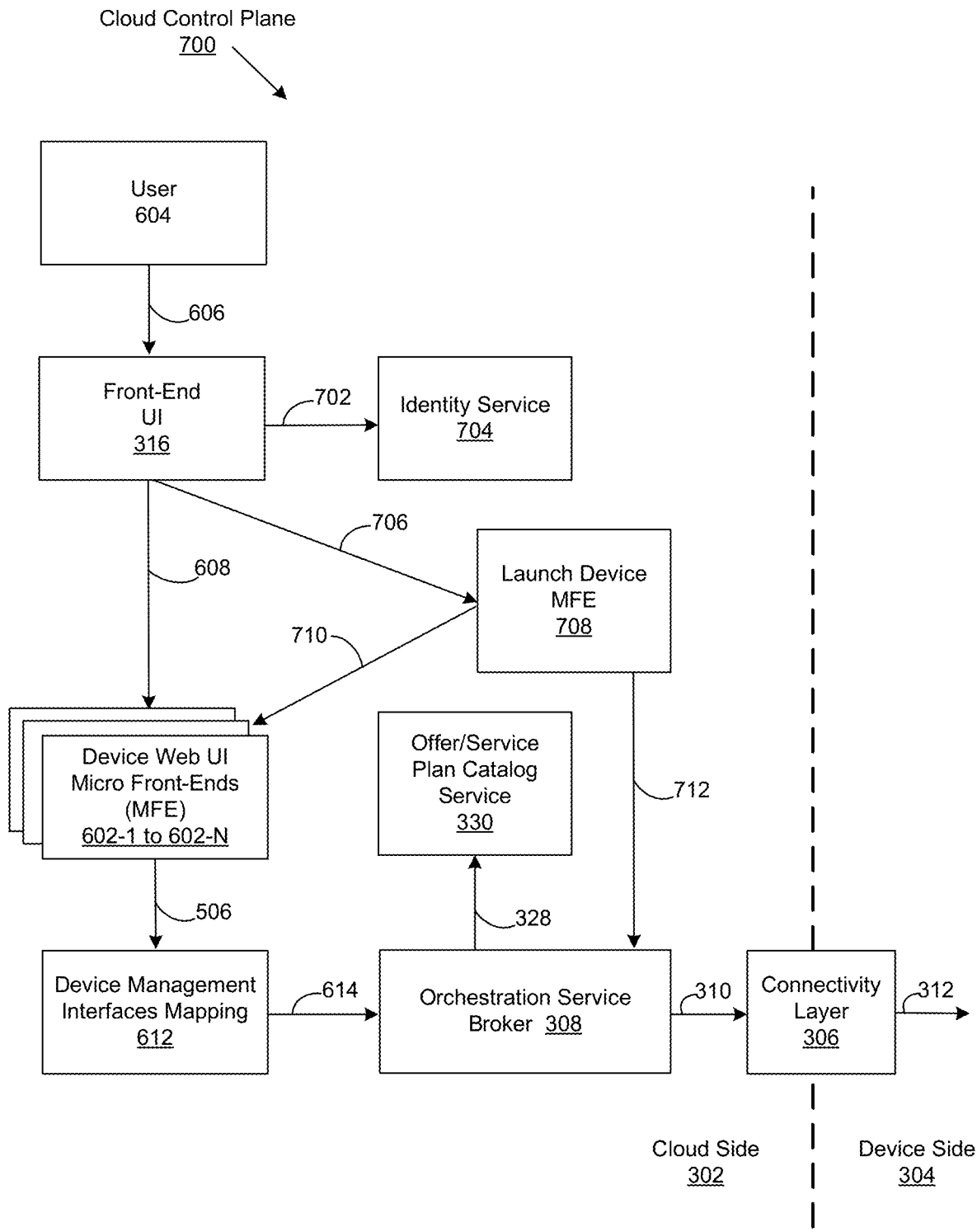
FIG. 7 illustrates a cloud control plane architecture as implemented in the present invention.

FIG. 7 shows a cloud control plane architecture 700 that builds on the previously described cloud control plane architecture 300 and cloud control plane architecture 600. Described are processes to manage information handling system/user access to devices management UI when bringing to the cloud. Furthermore, described are processes that support users from multiple entities (e.g., companies) to use device management UI to manage, devices, assets, appliances, etc. in private cloud. Element management UIs that are designed for a dedicated set of devices, assets, appliances, are made multi-tenant capable.

Implementations provide integrating built-in management UI access control policy of a device 324 with cloud control plane 700 access control mechanisms and capability to run in a multi-tenant cloud environment with minimal configuration and development effort.

In the described control plane architecture 300 of FIG. 3, processes are described as to mapping management APIs of devices 324 from on-premise to per offer instance namespace to extensible REST APIs of the orchestration service broker 308 of cloud side 302. The flow covers the path from connectivity layer 306, 312 to orchestration service broker 314, 322 to a POE 320, 326 to device 324.

In the described control plane architecture 600 of FIG. 6, processes are described to run a device web management UI application in the cloud (cloud control plane), intercept native management API calls, which are converted to device management REST APIs in the orchestration service broker 308 namespace, and then leverage the control flow described in FIG. 3 to complete the end-to-end device management from cloud to on-premise. The flow covers the path from device micro front-end 602, 610 to device management interfaces mapping 612, 614 to orchestration service broker 308, 310 to connectivity layer 306.

Referring to FIG. 7, the cloud control plane 700 further describes process to support automated integration of device access control to the cloud control plane 700 access control framework and enabling the device management UI application for a multi-tenant environment on the cloud.

A user 604 logins to cloud control plane 700, front-end UI 316. Implementations provide for a message 702 to identity service 704 which identifies and tracks security context. A use case can be when user 604 selects from the front-end UI 316 a device, asset or appliance to manage.

The front-end UI 316 sends a message 706 to launch device micro front-end service 708. The launch device micro front-end service 708 starts 710 a corresponding management web UI application that is packaged as a device web UI MFE 602. A new device web UI MFE 602 can be started per user per target device (or a cluster of devices). A device native web management UI is designed to manage a device (or a cluster of devices). This concept is supported such that a per user per instance approach is implemented to provide that device web UI MFE 602 support multi-tenancy.

The launch device micro front-end service 708 services sends a "add user" and "role assignment" REST requests 712 to orchestration service broker 308. The "add user" and "role assignment" REST requests 712 are mapped from device native "add user" and "role assignment" APIs to extended orchestration service broker 308 REST interfaces using processes described in FIG. 3. Such processes of cloud control plane 300 provide that "add user" and "role assignment" REST interfaces are declared in the corresponding service plan via the automated method. The orchestration service broker 308 then sends the "add user" and then the "role assignment" requests to orchestration service broker 314 to perform the "add user" and then "role assignment" with user's cloud identity via a POE 320 to the on-premise device 324. Security role is selected based on cloud control plane 700 policy to grant a user 604 required permissions to perform management operations. The front-end UI 316 can either prompt the user 604 for a credential, e.g., a password, or define an internal password to enable the user 604 authenticate to the on-premise device.

As the required device web UI MFE 602 is started on demand, and the user 604 is added and granted the required role in the target on-premise device 324, the front-end UI 316 redirects 608 the user 604 to access the device web UI MFE 602.

The user 604 is able to use the device web UI MFE 602 to access and manage specified on-premise device 324 through device management interfaces mapping 612 utility. The device web UI MFE 602 can allow authentication of the user 604, validate required role, and perform management operations of user 604 using the native APIs which are automatically mapped to the extended device orchestration service broker 308 REST requests to operate against the on-premise device 324.

Implementations provide for device web UI MFE 602 to remain idle for an extended period after operations are complete. The launch device micro front-end service 708 can terminate device web UI MFE 602 to reduce cloud control plane 700 computing resources. Starting and stopping a device web UI MFE 602 allows for managing a relatively large number devices 324.

The described processes enable multi-tenancy by providing for device native web management UI designed for managing a single device or a single cluster of devices ready to run in a multi-tenancy environment. Authentication and access control are integrated by integrating device native authentication and access control mechanisms with cloud control plane 700 user authentication and access control mechanism to create end-to-end identity integration and a single sign on user experience. Full automation is provided by implementing cloud control plane 700 automated provision mechanisms to automate multi-tenancy, and authentication and access control enabling and integration.

Figure 8:
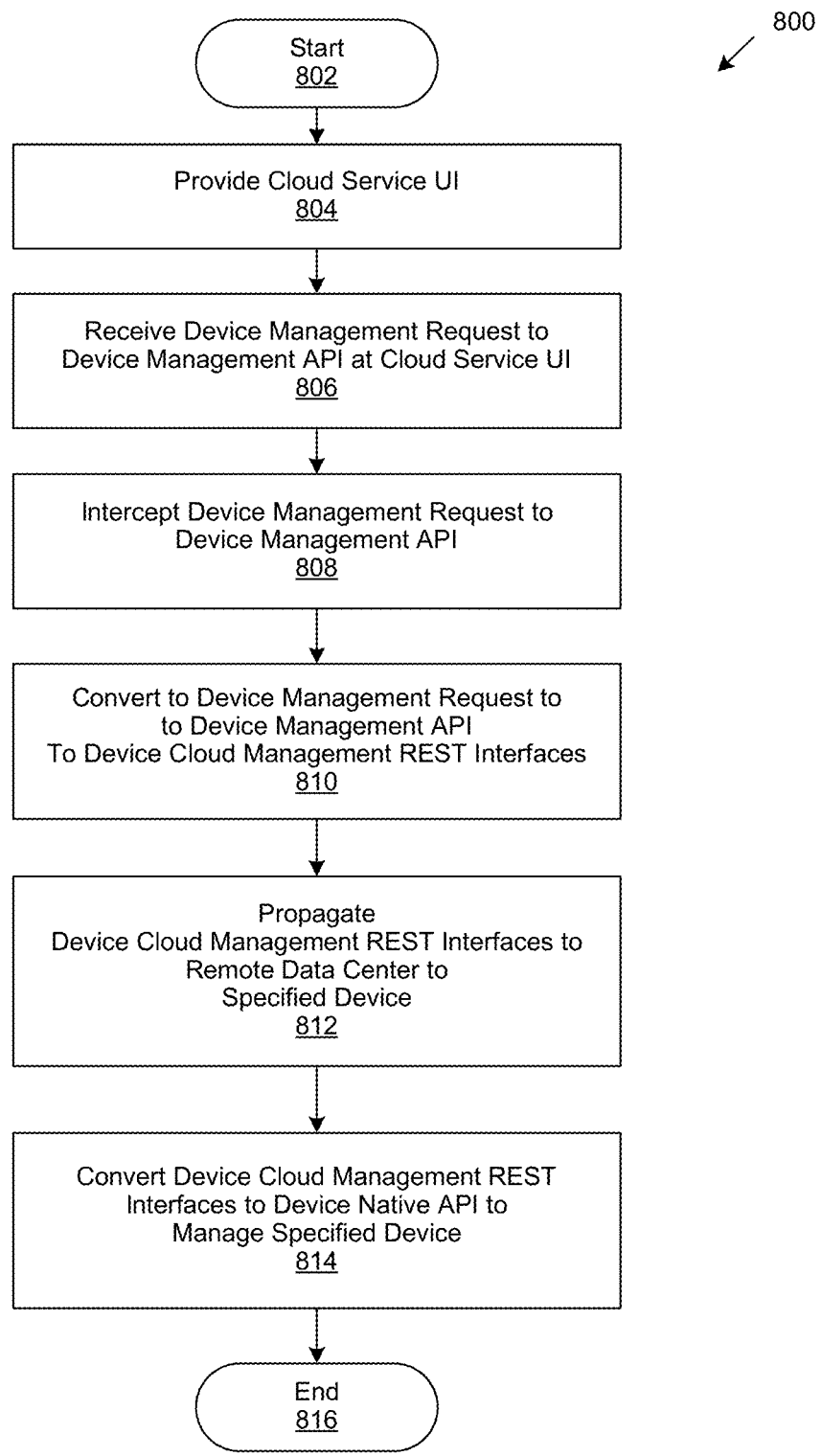
FIG. 8 is a generalized flowchart for managing devices in remote data centers using a cloud service user interface (UI).

FIG. 8 shows a generalized flowchart for managing devices in remote data centers using a cloud service user interface (UI). The order in which the method is described is not intended to be construed as a limitation, and any number of the described method steps may be combined in any order to implement the method, or alternate method. Additionally, individual steps may be deleted from the method without departing from the spirit and scope of the subject matter described herein. Furthermore, the method may be implemented in any suitable hardware, software, firmware, or a combination thereof, without departing from the scope of the invention.

At step 802, the process 800 starts. At step 804, front-end user interface (UI) 316 at cloud service side 302, is made available to information handling system(s) 202. At step 806, at the front-end UI, a device management request to device management API is received. Such request can be HTTP requests. At step 808, the device management request to device management API is intercepted. At step 810, the device management request to device management API is converted to device cloud management REST interfaces. At step 812, the device cloud management REST interfaces are propagated to device side 304, or remote data center for a specified device. At step 814, the device cloud management REST interfaces are converted to device native API to manage the specified device. A product orchestrator engine 320 can perform this step. At step 816, the process 800 ends.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or step diagrams of methods, apparatus (systems) and computer program products according to embodiments of the invention. It will be understood that each step of the flowchart illustrations and/or step diagrams, and combinations of steps in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram step or steps.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for managing devices in remote data centers using a cloud service user interface (UI) comprising:
    providing the cloud service UI at an information handling system;
    receiving a device management request to device management application program interface (API) at the cloud service UI;
    intercepting the device management request to device management API;
    converting the device management request to device management API to a device cloud management REST interface;
    propagating the device cloud management REST interface to a remote data center of devices; and
    converting the device cloud management REST interface to device native API used to manage a specified device.

2. The computer-implementable method of claim 1 further comprising mapping information handling and/or user cloud service identity to information handling and/or user device identity and access control policy to provide separated instances of device management UI for users.

3. The computer-implementable method of claim 1, wherein the request is HTTP.

4. The computer-implementable method of claim 1, wherein the cloud service UI connects to a cloud side orchestration service broker connected to connectivity layer connected to a device side orchestration service broker.

5. The computer-implementable method of claim 1, wherein cloud service UI connects with a device web UI micro front-end for mapping management API of a device and run a device native web UI application.

6. The computer-implementable method of claim 1 further comprising a device web UI micro front-end that connects with the cloud service UI for mapping management API of a device and run a device native web UI application.

7. The computer-implementable method of claim 1 further comprising multiple device web UI micro front-ends that connect with the cloud service UI for individual information handling systems and/or users, for mapping management API of a device and run a device native web UI application.

8. A system comprising:
    a plurality of processing systems communicably coupled through a network, wherein the processing systems include non-transitory, computer-readable storage medium embodying computer program code interacting with a plurality of computer operations for managing devices in remote data centers using a cloud service user interface (UI) comprising:
    providing the cloud service UI at an information handling system;
    receiving a device management request to device management application program interface (API) at the cloud service UI;
    intercepting the device management request to device management API;
    converting the device management request to device management API to a device cloud management REST interface;
    propagating the device cloud management REST interface to a remote data center of devices; and
    converting the device cloud management REST interface to device native API used to manage a specified device.

9. The system of claim 8 further comprising mapping information handling and/or user cloud service identity to information handling and/or user device identity and access control policy to provide separated instances of device management UI for users.

10. The system of claim 8, wherein the request is HTTP.

11. The system of claim 8, wherein the cloud service UI connects to a cloud side orchestration service broker connected to connectivity layer connected to a device side orchestration service broker.

12. The system of claim 8, wherein a device specific product orchestrator engine performs the converting the device cloud management REST interface to device native API used to manage a specified device.

13. The system of claim 8 further comprising a device web UI micro front-end that connects with the cloud service UI for mapping management API of a device and run a device native web UI application.

14. The system of claim 8 further comprising multiple device web UI micro front-ends that connect with the cloud service UI for individual information handling systems and/or users, for mapping management API of a device and run a device native web UI application.

15. A non-transitory, computer-readable storage medium embodying computer program code, the computer program code comprising computer executable instructions configured for:
- providing the cloud service UI at an information handling system;
- receiving a device management request to device management application program interface (API) at the cloud service UI;
- intercepting the device management request to device management API;
- converting the device management request to device management API to a device cloud management REST interface;
- propagating the device cloud management REST interface to a remote data center of devices; and
- converting the device cloud management REST interface to device native API used to manage a specified device.

16. The non-transitory, computer-readable storage medium of claim 15 further comprising mapping information handling and/or user cloud service identity to information handling and/or user device identity and access control policy to provide separated instances of device management UI for users.

17. The non-transitory, computer-readable storage medium of claim 15, wherein the cloud service UI connects to a cloud side orchestration service broker connected to connectivity layer connected to a device side orchestration service broker.

18. The non-transitory, computer-readable storage medium of claim 15, wherein a device specific product orchestrator engine performs the converting the device cloud management REST interface to device native API used to manage a specified device.

19. The non-transitory, computer-readable storage medium of claim 15 further comprising a device web UI micro front-end that connects with the cloud service UI for mapping management API of a device and run a device native web UI application.

20. The non-transitory, computer-readable storage medium of claim 15 further comprising multiple device web UI micro front-ends that connect with the cloud service UI for individual information handling systems and/or users, for mapping management API of a device and run a device native web UI application.

* * * * *